2,820,787

ANTHRAQUINONE AZO DYE

David I. Randall, Easton, and Nicholas W. Solonen, Ambler, Pa., assignors to General Aniline & Film Corporation, New York, N. Y., a corporation of Delaware No Drawing. Application August 4, 1954
Serial No. 447,887

2 Claims. (Cl. 260—193)

The present invention relates to the production of novel azo dyestuffs having the formula

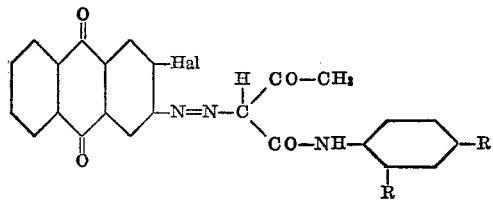

wherein Hal represents halogen and R represents lower alkyl.

It is an object of this invention to provide pigments yielding yellow shades of superior brightness and light fastness. Other objects and advantages will appear as the description proceeds.

The attainment of the above objects is made possible by the provision of dyestuffs of the above formula. These dyestuffs have been found to be brighter, greener and superior in light fastness to most other yellow pigments now available. The excellent light fastness, brightness and remarkable clarity of shade of the pigments of this invention is particularly surprising since literature, particularly the B. I. O. S. reports, has indicated that only α-aminoanthraquinone diazo components, as compared with β-aminoanthraquinone diazo components give lightfast products.

In the formula given above, Hal may represent bromine or preferably, chlorine and R may represent ethyl, propyl, or the like, or preferably, methyl. It will be understood that the two R substituents may differ.

The dyestuffs of this invention may be readily prepared in known manner by diazotizing a 2-amino-3-haloanthraquinone and coupling the diazotized compound with a compound of the formula

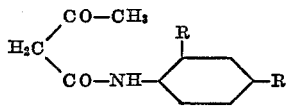

wherein R has the values given above.

It will be readily understood that in the production of the dyestuffs of this invention as above described, diazotizing and/or coupling may be carried out in substance, on a substratum, or in situ. These dyestuffs may be employed for coloring (dyeing, pigmenting, etc.) in bulk, on the fiber, and the like. They may be employed for coloring or pigmenting natural or artificial resins and plastics in bulk, organic solvents, stains, varnishes, lacquers and the like. When used in a nitrocellulose lacquer, superior yellow light fast shades are obtained. When employed for coloring an aluminum coated paper, yellow shades are obtained having superior light fastness and transparency. They may also be incorporated into spinning solutions of film-forming materials such as cellulose acetate and the like to obtain yellow products having superior properties in light fastness, brightness and clarity.

The following example in which parts are by weight unless otherwise indicated is illustrative of the instant invention and is not to be regarded as limitative.

Example

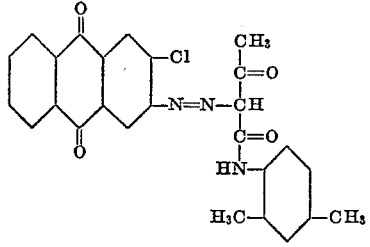

173 g. of 2-amino-3-chloroanthraquinone were dissolved in 158 parts of 96% sulfuric acid at 5–10° C. To the stirred solution 5.6 g. powdered sodium nitrite was added over a 15 minute period. After diazotization was complete the solution was poured over ice. The precipitate was collected by filtration and washed with 20% sodium sulfate solution. The diazo presscake was dissolved in 2000 cc. of water at 25° C., filtered for clarification, and then cooled to 10° C.

The coupling suspension was prepared as follows:

A solution of 215 cc. water, 5.8 cc. 37.5% sodium hydroxide and 14.1 g. of acetoacet-2,4-xylidide was made at 30° C. On slow addition of 4.7 g. glacial acetic acid in 132 cc. $H_2O$, a finely divided form of the coupling component was obtained. It was buffered by the addition of 22.0 g. sodium acetate.

Coupling was effected by adding in 1.5 hours the diazo solution at 10° C. to the stirred coupling suspension at 5–10° C. Stirring was continued an additional 12 hours without cooling. Isolation was effected by filtration and washing neutral. The resulting product colors nitrocellulose lacquers in bright green shades of superior light fastness.

This invention has been disclosed with respect to preferred embodiments, and various modifications and variations thereof will become obvious to the person skilled in the art. It is to be understood that such modifications and variations are to be included within the spirit and purview of this application and the scope of the appended claims.

We claim:

1. A dyestuff having the formula

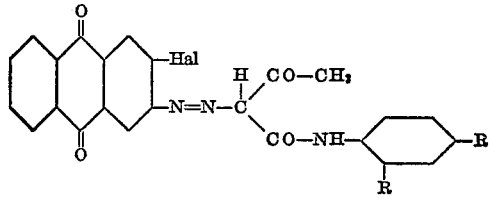

wherein Hal represents halogen selected from the group consisting of chlorine and bromine and R represents lower alkyl.

2. A dyestuff having the formula

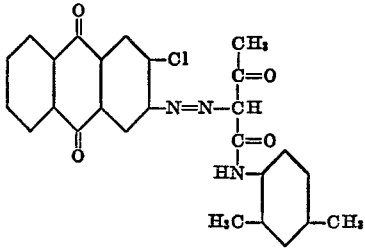

(References on following page)

References Cited in the file of this patent

UNITED STATES PATENTS 1,028,139 Schmidt et al. _____ June 4, 1912

FOREIGN PATENTS 542,213 Great Britain _____ Dec. 31, 1941
226,629 Switzerland _____ July 16, 1943
279,523 Switzerland _____ Mar. 1, 1952
673,226 Great Britain _____ June 4, 1952
883,018 Germany _____ July 13, 1953
1,057,593 France _____ Oct. 28, 1953